United States Patent
Fujita

(10) Patent No.: US 7,359,049 B2
(45) Date of Patent: Apr. 15, 2008

(54) LIGHT SOURCE DEVICE AND SPECTROPHOTOMETER WITH THE LIGHT SOURCE DEVICE

(75) Inventor: Takeshi Fujita, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 459 days.

(21) Appl. No.: 11/079,282

(22) Filed: Mar. 15, 2005

(65) Prior Publication Data

US 2005/0213091 A1    Sep. 29, 2005

(30) Foreign Application Priority Data

Mar. 26, 2004    (JP)    .............................. 2004-092047

(51) Int. Cl.
*G01J 3/42* (2006.01)
*H01J 5/16* (2006.01)

(52) U.S. Cl. ....................... 356/319; 313/310; 313/311

(58) Field of Classification Search ........ 356/319–334, 356/302; 313/46, 49, 51, 110, 111
See application file for complete search history.

(56) References Cited

U.S. PATENT DOCUMENTS

| | | | | |
|---|---|---|---|---|
| 3,924,950 A * | 12/1975 | Siegler, Jr. | .................... | 356/307 |
| 5,025,192 A * | 6/1991 | Okamoto | ..................... | 313/623 |
| 5,128,588 A * | 7/1992 | Kameya et al. | .............. | 313/623 |
| 6,683,685 B2 * | 1/2004 | Sakai | .......................... | 356/307 |
| 6,703,769 B2 * | 3/2004 | Yamane et al. | ................ | 313/46 |
| 6,795,180 B2 * | 9/2004 | Bungo | ......................... | 356/319 |

* cited by examiner

*Primary Examiner*—Layla G. Lauchman
(74) *Attorney, Agent, or Firm*—Manabu Kanesaka

(57) ABSTRACT

A light source device for a spectrophotometer includes a light source chamber, a light source retained in the light source chamber and having an electrode therein for generating light, an electrode support part connected to the electrode and extending outside the light source chamber, and a cover disposed around the electrode support part for covering a portion of the electrode support part situated outside the light source chamber. A cooling mechanism is installed for cooling the light source chamber from an outside thereof so that the light source is not directly cooled by means of the cover. The spectrophotometer includes the light source device.

7 Claims, 3 Drawing Sheets

LIGHT SOURCE DEVICE AND SPECTROPHOTOMETER WITH THE LIGHT SOURCE DEVICE

BACKGROUND OF THE INVENTION AND RELATED ART STATEMENT

The present invention relates to a light source device for a spectrophotometer to be used as a general-purpose spectrophotometer or a detector of an analytical device such as a liquid-phase chromatograph. Also, the invention relates to a spectrophotometer equipped with the light source device.

A spectrophotometer comprises a light source chamber housing a light source; an optical system for directing light from the light source to a sample; a light detector for detecting light transmitted through the sample; and a light splitter for splitting light directed to the sample or light transmitted through the sample and directed to the detector. A substance has an inherent light absorption coefficient at a specific wavelength. The spectrophotometer identifies a substance from a wavelength that the substance absorbs, or measures a concentration of a substance according to transmittance or absorption of light at a specific wavelength. In a general-purpose spectrophotometer, a liquid sample is placed in a transparent cell, and transmittance of infrared light, visible light, or the like, passing through the cell is measured to analyze the sample. In a liquid-phase chromatograph, a sample flows through a detector from a column, and a spectrophotometer irradiates light on the detector to analyze the sample.

A single light source does not have sufficient light intensity in a wide range from infrared light and visible light to ultraviolet light. Accordingly, the spectrophotometer is normally provided with a heavy hydrogen lamp for generating light mainly in an ultraviolet region and a halogen lamp for generating light in infrared and visible regions. An optical axis is switched to use light from one of the lamps as measurement light (see Patent Document b 1).

A lamp is a heat-generating source as well as a light-emitting source. Accordingly, in the spectrophotometer, the lamp is fixed at a specific position, and is cooled below a specific temperature. Further, the lamp is installed in the spectrophotometer in a state being housed inside a light source chamber, so that a temperature change of a bulb (glass) part is minimized to stabilize light. Cooling air is sent to the light source chamber to be forcibly air-cooled, thereby cooling the lamp housed therein.

The lamp is an expendable part and installed in the light source chamber in a manner so as to be replaceable. FIGS. 4(A) and 4(B) show mechanisms of replacing a lamp in a light source chamber.

As shown in FIG. 4(A), a lamp 2 is inserted into a socket 4, and the socket 4 is installed in an opening at one end of a light source chamber 6. The socket 4 is fixed in the light source chamber 6, and the light source chamber 6 is provided with an opening at an opposite side to the socket 4 for replacing the lamp 2. A lid 8 is detachably attached to the opening, so that the lamp 2 can be replaced by removing the lid 8.

In the light source chamber shown in FIG. 4(A), it is difficult to replace the lamp 2 in a state that the lamp 2 is retained in the light source chamber. Also, it is necessary to touch a bulb part (glass part) of the lamp 2 with a hand, thereby requiring careful handling. If the bulb part is stained, it is possible to deteriorate performance of the lamp.

FIG. 4(B) shows a light source chamber mainly used recently. In the light source chamber, the lamp 2 is fixed to a flange 10, and the flange 10 is detachably attached to an opening of a light source chamber 6a. When the lamp 2 is a heavy hydrogen lamp, a light-emitting part assembly 12 is provided inside the lamp, and heavy hydrogen gas is filled in the lamp at a low-pressure of several Torr. An electrode 14 is connected to the light-emitting part assembly 12, and an electrode support member 14a passes through the flange 10 and extends outside the light source chamber 6a. A window 7 with a transparent window plate fitted therein is formed in the light source chamber 6a for directing light from the lamp 2 to a sample chamber or a light-splitting part.

With the light source chamber shown in FIG. 4(B), it is possible to remove the flange 10 from the light source chamber and take out the flange 10 together with the lamp 2 for replacement without touching the lamp 2, thereby improving handling during replacement of the lamp.

Patent Document 1: Japanese Patent Publication (Kokai) No. 2003-185498

In the light source chamber shown in FIG. 4(B), the bulb part is housed inside the light source chamber 6a. Accordingly, the bulb part does not directly contact the cooling air, thereby preventing a change in the output characteristic due to a temperature change of the bulb part. However, the electrode support part 14a connected to the light-emitting part assembly 12 is exposed outside the light source chamber 6a. Accordingly, the cooling air contacts the electrode support part 14a, and the light-emitting part assembly 12 may be influenced by a temperature via the electrode 14 from the electrode support part 14a, thereby changing the output characteristic.

The cooling air is supplied into the light source chamber 6a from outside the spectrophotometer. When the electrode support part protrudes out from the light-source chamber, the cooling air directly contacts the electrode support part. Accordingly, when the light source is a heavy hydrogen lamp sensitive to a temperature, the lamp is easily influenced by a variation in a room temperature and a flow of the cooling air, thereby changing light intensity and a lighting position of the lamp. As a result, the spectrophotometer may suffer a noise and drift of a baseline of a measurement value such as light absorption.

In view of the problems described above, an object of the present invention is to provide a spectrophotometer with a lamp sensitive to a temperature such as a heavy hydrogen lamp as a light source, in which it is possible to minimize an influence of a temperature on a lamp characteristic.

Further objects and advantages of the invention will be apparent from the following description of the invention.

SUMMARY OF THE INVENTION

The present invention is directed to a spectrophotometer in which it is necessary to stabilize luminous energy of light. Such a spectrophotometer includes a discharge tube with a light emission characteristic susceptible to a temperature, and may include other lamps as well. Among discharge tubes, a heavy hydrogen tube is filled with heavy hydrogen gas at a low-pressure, so that an output characteristic thereof is sensitive to a temperature change.

In order to attain the objects described above, according to the present invention, a spectrophotometer includes a cooling mechanism for cooling a light source chamber with a cooling gas, and at least a discharge tube as a light source inside the light source chamber. An electrode support part is connected to an internal electrode of the discharge tube, and a cover is provided for covering a part of the electrode support part exposed outside the light source chamber to prevent direct contact with the cooling gas. The discharge tube may include a heavy hydrogen lamp.

In the present invention, the electrode support part protruding from the light source chamber is covered by the cover. Accordingly, the cooling gas does not directly contact the electrode support part, and it is possible to minimize an influence of a change in a room temperature and a gas flow, thereby stabilizing light-emitting characteristic of the lamp.

BRIEF DESCRIPTION OF THE DRAWINGS

FIGS. 3(A) and 3(B) are charts showing results of light absorption measurements, wherein FIG. 3(A) shows a result of a spectrophotometer without a cover for covering an electrode support part, and FIG. 3(B) shows a result of the spectrophotometer with a cover according to the embodiment of the present invention.

DETAILED DESCRIPTION OF PREFERRED EMBODIMENTS

Figure 2:
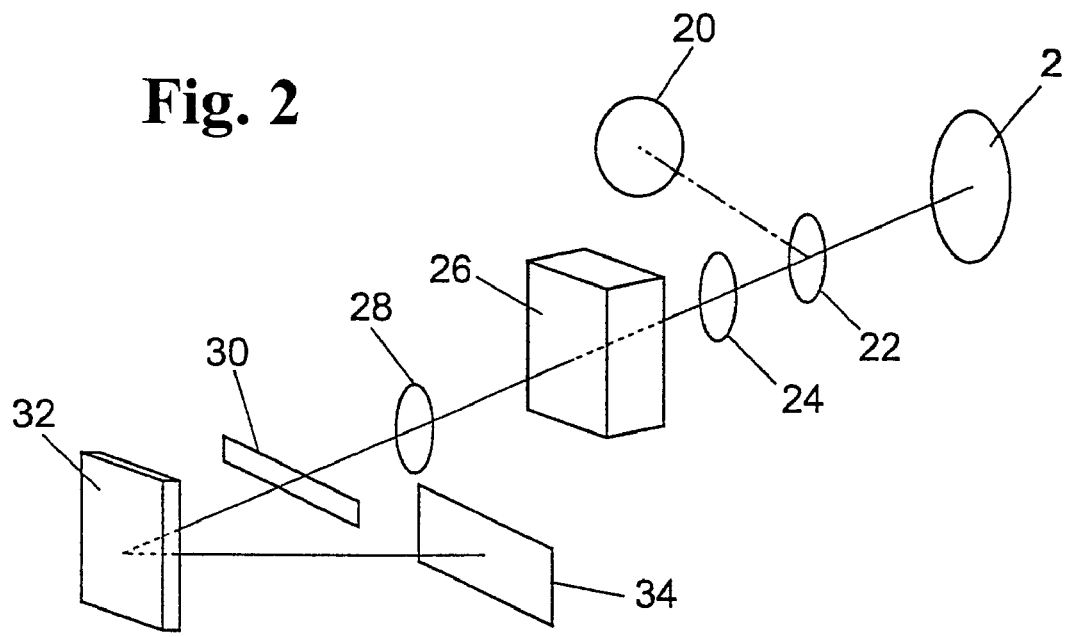
FIG. 2 is a schematic diagram showing a spectrophotometer according to the embodiment of the present invention.

Hereunder, embodiments of the present invention will be described with reference to the accompanying drawings. FIG. 2 is a schematic view showing an optical system of a spectrophotometer according to an embodiment of the present invention.

The optical system includes two lamps as light sources, i.e., a heavy hydrogen lamp 2 and a halogen lamp 20. The lamps 2 and 20 are arranged such that optical axes thereof intersect. A light path switching plate 22 is provided at the intersection. The light path switching plate 22 is formed of, for example, a disk provided with an opening, a semitransparent lens, and a fully reflective lens. The light path switching plate 22 at the intersection of the optical axes of the lamps 2 and 20 is rotated. Accordingly, it is possible to irradiate light of the heavy hydrogen lamp 2, mixed light of the lamps 2 and 20, or light of the halogen lamp 20 on a cell holder 26. Light directed by the light path switching plate 22 is collected by a projection lens 24 and is projected on a sample cell inside the cell holder 26, so that a wavelength component corresponding to a characteristic of the sample is absorbed. Light transmitted through the sample cell is input into a grating 32 from a collecting lens 28 through an entrance slit 30 of a light splitter, so that the grating 32 splits light. Then, light is input into a photodiode array detector 34 to be detected.

In the embodiment, light passing through the sample cell is split in the light splitter. An arrangement of the light splitter is not limited thereto, and the light splitter may be placed between the light source and the cell holder, so that light is split and input into the sample cell.

Figure 1:
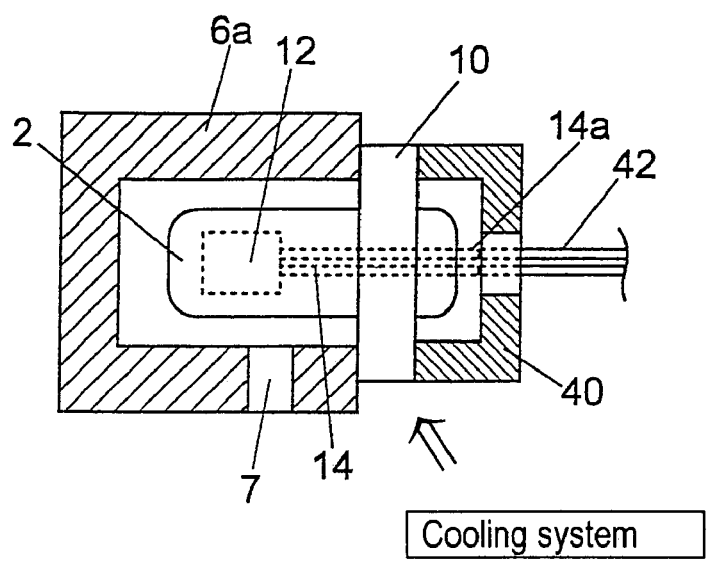
FIG. 1 is a sectional view showing a light source chamber according to an embodiment of the present invention.

FIG. 1 is a schematic view showing a light source chamber retaining the heavy hydrogen lamp 2 in the spectrophotometer. The spectrophotometer may further have another lamp, for example, a tungsten lamp. In the embodiment, only a part related to the heavy hydrogen lamp is shown.

Figure 4A:
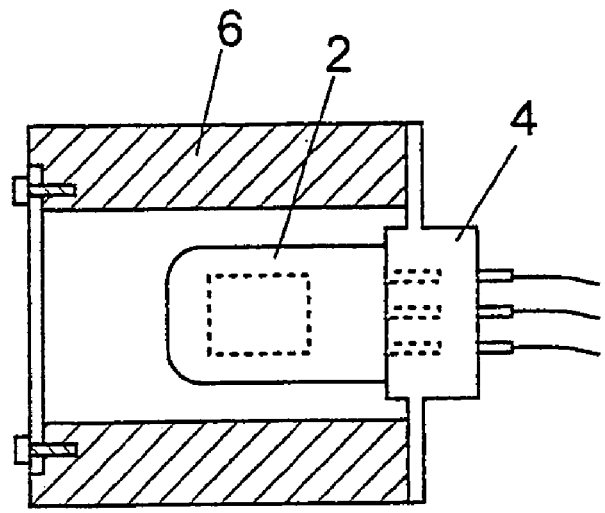
FIGS. 4(A) and 4(B) are sectional views showing light source chambers in conventional spectrophotometers.
Figure 4B:
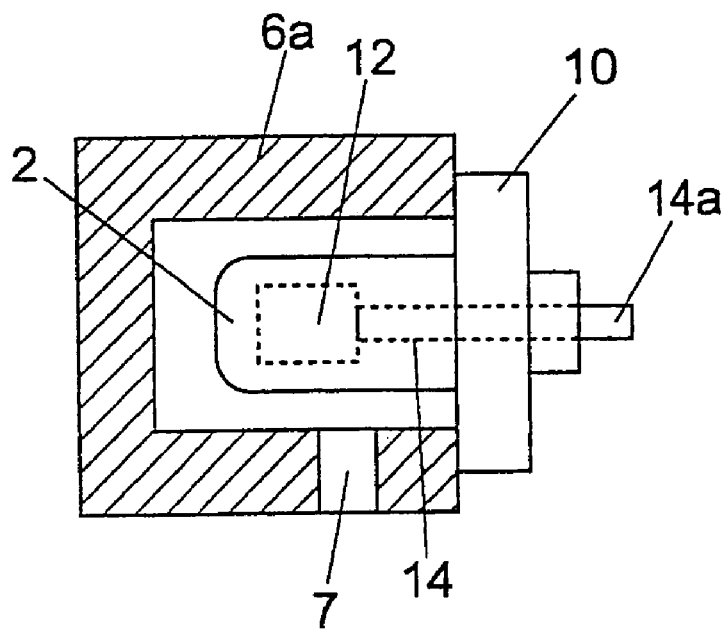

Similar to a structure shown in FIG. 4(B), the heavy hydrogen lamp 2 attached to a flange 10 is detachably attached to an opening of a light source chamber 6a. An electrode support part 14a protrudes from the light source chamber 6a, and is connected to an electrode 14 connected to a light-emitting part assembly 12 inside the lamp 2. The electrode support part 14a is covered by a cover 40 covering a base part of the lamp 2. A small window is formed in the cover 40, and a lead wire 42 connected to the electrode support part 14a is drawn outside through the window.

A bulb part of the lamp 2 is housed inside the light source chamber 6a, and does not directly contact a flow of cooling air for cooling the light source chamber 6a. Also, the electrode support part 14a is covered by the cover 40 and does not directly contact the cooling air. A size of the cover 40 is not limited to that shown in FIG. 1, and may cover an outer perimeter part of the flange 10, as far as the cooling air does not directly contact the electrode support part 14a. A material of the cover 40 is not particularly limited, and may include ceramic or plastic in addition to metal such as aluminum and iron.

Figure 3A:
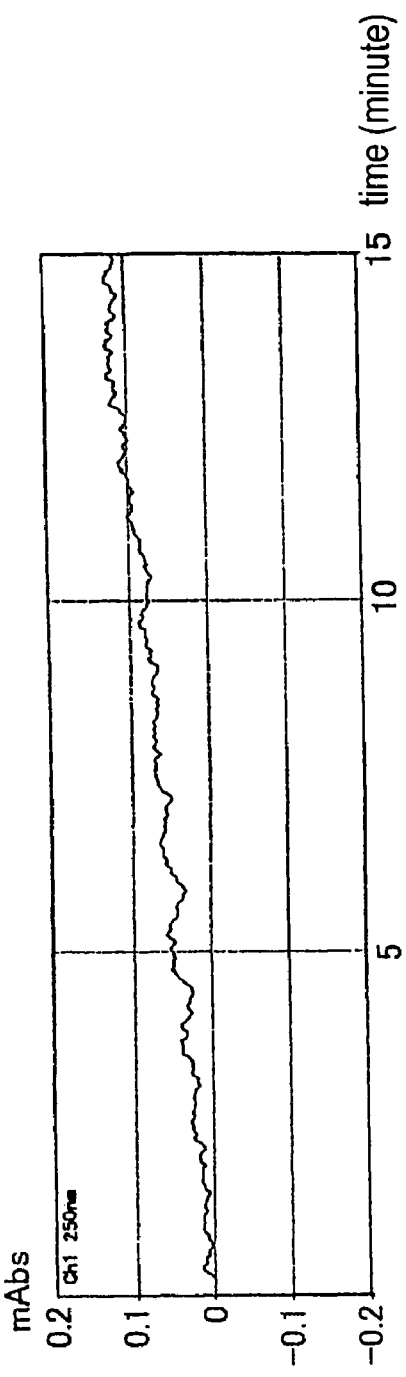
Figure 3B:
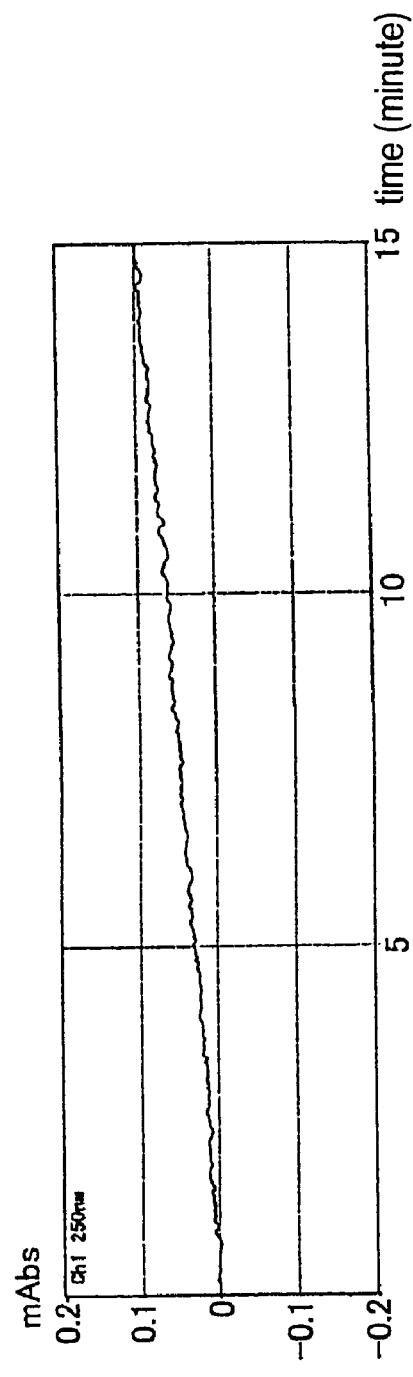

Light absorption of a sample was measured at a wavelength of 250 nm using the spectrophotometer with and without the cover 40, and results are shown in FIGS. 3(A) and 3(B). FIG. 3(A) shows a result of the spectrophotometer without the cover 40 for covering the electrode support part, and FIG. 3(B) shows a result of the spectrophotometer with the cover 40 according to the embodiment of the present invention. The horizontal axis represents time, and an entire range is 15 minutes. The vertical axis represents light absorption (mAbs), and FIGS. 3(A) and 3(B) are shown in the same scale.

When the results are compared, it is apparent that a noise and an amount of drift become smaller in the spectrophotometer with the cover.

As described above, in the spectrophotometer of the present invention, luminous energy of the light source lamp becomes stable and the noise is reduced. Accordingly, the spectrophotometer can be used as a general-purpose spectrophotometer or a detector such as a liquid-phase chromatograph for analyzing sample components in a wide range from high concentrations to low concentrations.

The disclosure of Japanese Patent Application No. 2004-092047, filed on Mar. 26, 2004, is incorporated in the application.

While the invention has been explained with reference to the specific embodiments of the invention, the explanation is illustrative and the invention is limited only by the appended claims.

What is claimed is:

1. A light source device for a spectrophotometer, comprising:
   a light source having an electrode therein for generating light,
   an electrode support part connected to the electrode and extending outwardly from the light source,
   a light source chamber for retaining therein the light source with the electrode, said electrode support part extending outwardly from the light source chamber, and
   a cover attached to the light source chamber to cover the electrode support part situated outside the light source chamber for covering the electrode support part situated outside the light source chamber.

2. A light source device according to claim 1, wherein said light source includes a flange at one side thereof attached to an outside of the light source chamber, said electrode support part being attached to the flange.

3. A light source device according to claim 1, further comprising a cooling mechanism for cooling the light source chamber from an outside of the light source chamber so that the light source is not directly cooled by means of the cover.

4. A light source device according to claim 1, wherein said light source includes a discharge tube.

5. A light source device according to claim 4, wherein said discharge tube includes a heavy hydrogen lamp.

6. A spectrophotometer comprising:
   said light source device according to claim 1,
   an optical system for directing the light from the light source device to a sample,
   a light detector for detecting the light passing through the sample, and
   a diffraction granting for diffracting the light from the light source to the sample or the light passing through the sample to the detector.

7. A light source device according to claim 3, wherein said cover includes one hole, and the electrode includes a lead wire extending outwardly from the cover through the one hole.

* * * * *